Sept. 25, 1962                R. E. BETANCOURT                3,055,118
                               EDUCATIONAL DEVICE
Filed April 28, 1960                                          3 Sheets-Sheet 1
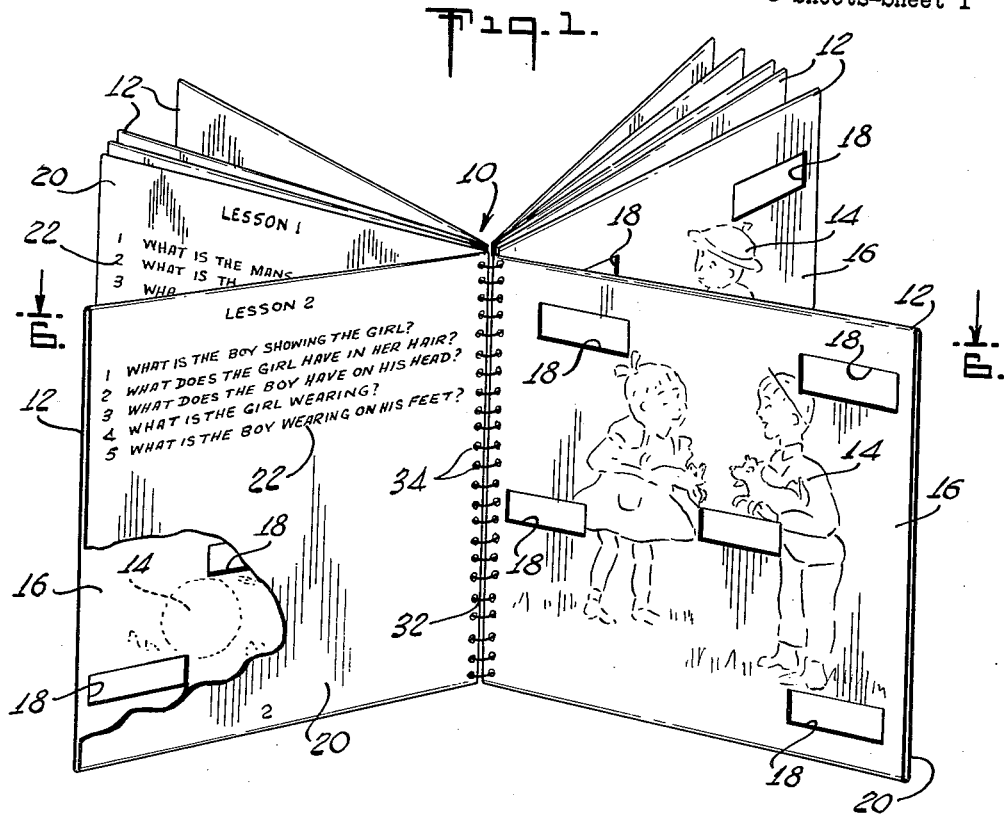
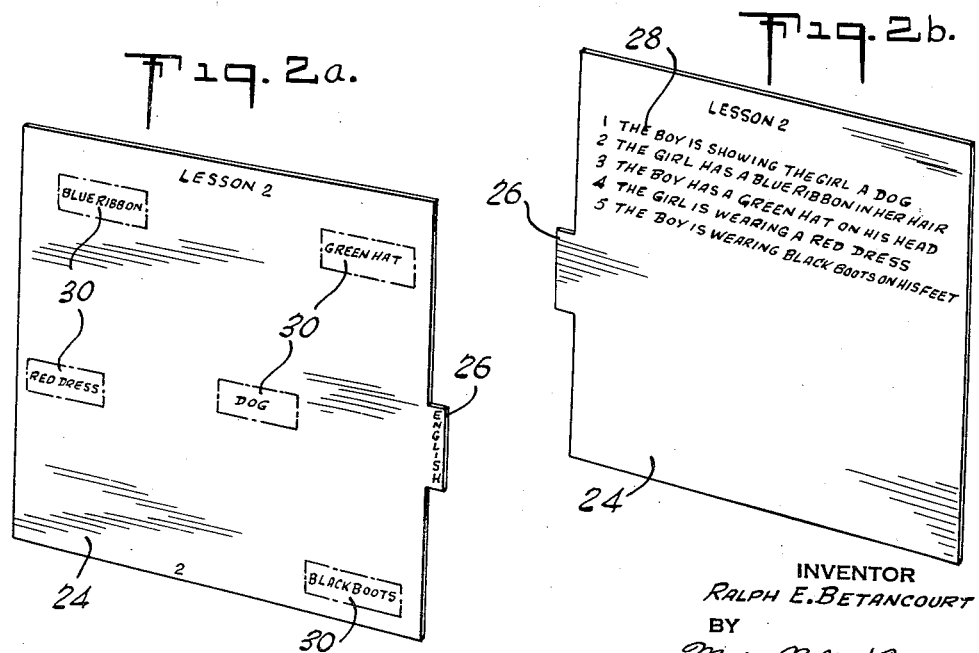
INVENTOR
RALPH E. BETANCOURT
BY
Moses, Nolte, & Nolte
ATTORNEYS

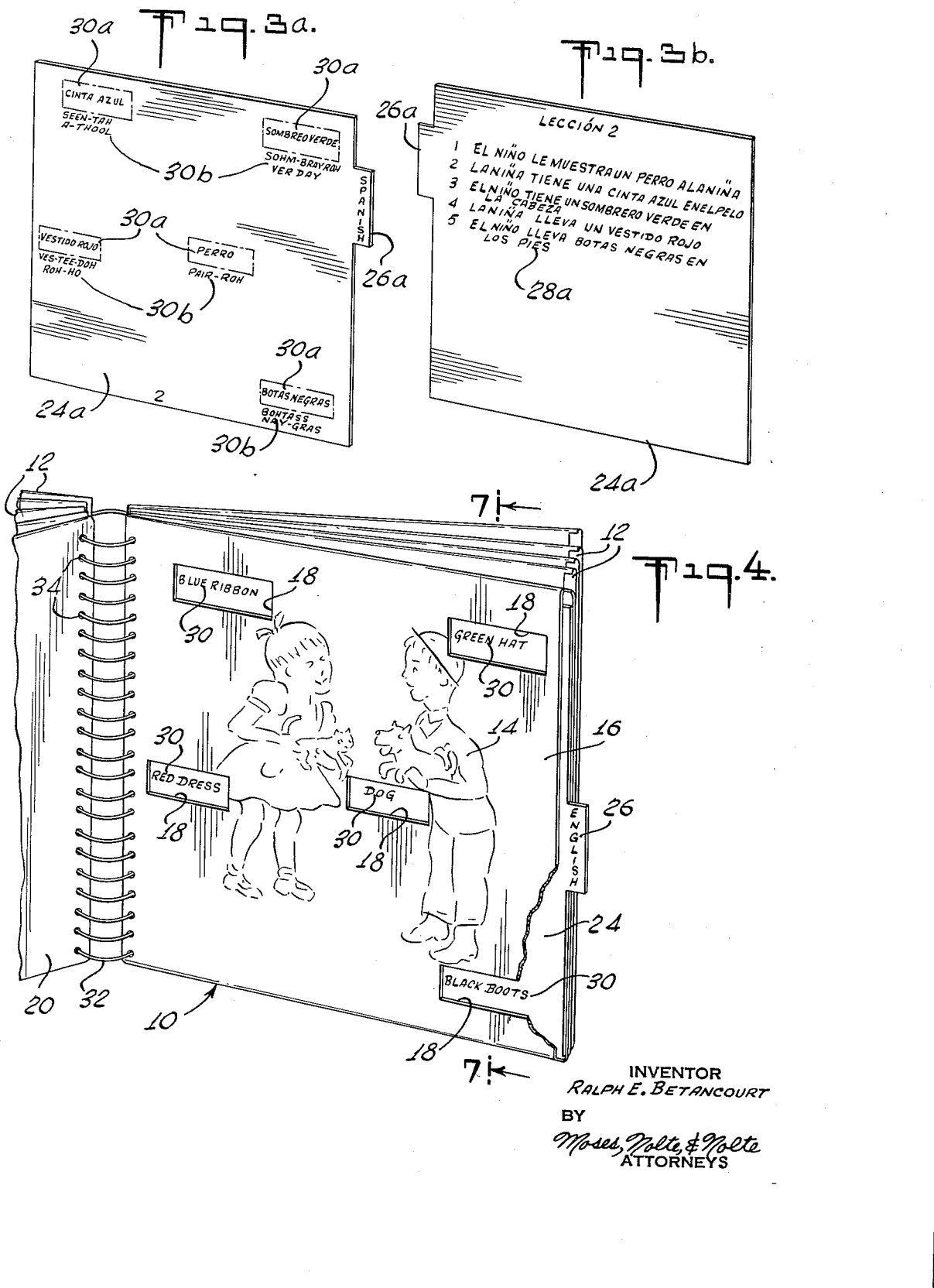

Sept. 25, 1962 R. E. BETANCOURT 3,055,118
EDUCATIONAL DEVICE
Filed April 28, 1960 3 Sheets-Sheet 3
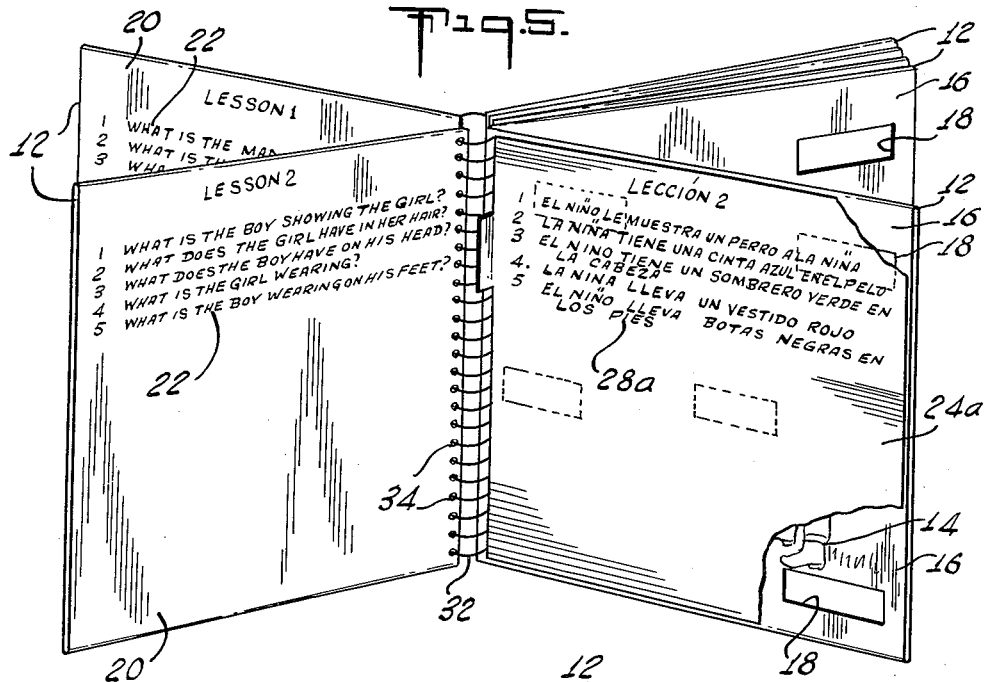
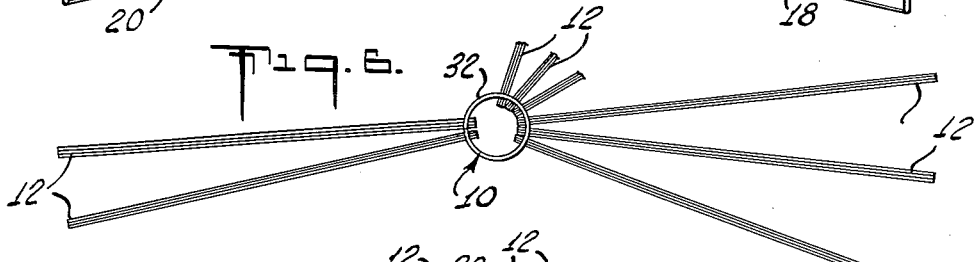
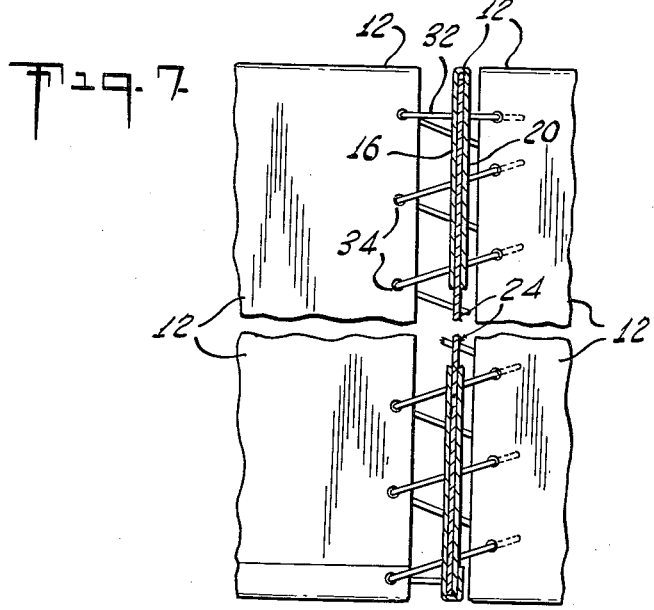
INVENTOR
RALPH E. BETANCOURT
BY
Moses, Nolte, & Nolte
ATTORNEYS United States Patent Office 3,055,118
Patented Sept. 25, 1962

3,055,118
EDUCATIONAL DEVICE
Ralph E. Betancourt, 357 Venetian Blvd.,
Lindenhurst, N.Y.
Filed Apr. 28, 1960, Ser. No. 25,479
2 Claims. (Cl. 35—9)

The present invention relates in general to an educational device and more particularly to a book having illustrated pocket-like pages adapted to receive an insert sheet containing answers to enumerated questions in the book and indicia in registry with spaced apertures about the page illustrations.

An important object of the invention is to provide an illustrated self-teaching question and answer book wherein cut out window portions are strategically placed about identifiable portions of a graphic illustration printed on one side of a pocket-like page. The back side of the preceding page in the book is printed with suitable enumerated questions directed to the action portrayed in the facing illustration and to the unnamed items in the illustration associated with the cut out window locations. An answer sheet is slidably insertable within each page pocket to display indicia through the window portions and also has printed thereon enumerated answers corresponding to the enumerated questions appearing on the back side of the preceding page.

Another object of the invention is to provide a book which is easily adaptable to the teaching of many different languages without undue multiplication of cost. This object is easily accomplished by providing alternate insert answer sheets containing indicia and enumerated sentence answers in any desired language to the enumerated questions of each lesson.

A still further object of the invention is to provide an educational device which combines, in cooperative manner, the unnamed portions of a situation type illustration, where both knowledge of the unnamed portion and the action portrayed by the illustration aid in answering the enumerated questions.

Another object of the invention is to provide an improved English language lesson book which is adaptable to the teaching of a multiplicity of different languages.

A further object of the invention is to provide an educational device which is simple in form, durable in construction, flexible in use and economical to manufacture.

Other objects and advantages of the invention will become apparent and the invention will be fully understood from the following description and drawings in which:

FIG. 1 is a perspective view showing the invention open to lesson 2;

FIG. 2a is a perspective view of the front side of the insert sheet for lesson 2;

FIG. 2b is a perspective view of the rear side of the insert sheet for lesson 2;

FIG. 3a and FIG. 3b are perspective views of the front and rear sides of a Spanish language answer sheet for the same lesson;

FIG. 4 is a perspective view showing the indicia on the insert sheet in view through the page windows;

FIG. 5 is a perspective view of the invention showing the insert sheet of FIG. 3b in place on top of the illustration with the enumerated answers thereon aligned with the enumerated questions on the facing page.

FIG. 6 is a partial cross sectional view taken along line 6—6 of FIG. 1; and

FIG. 7 is a broken cross sectional view taken along line 7—7 of FIG. 4.

Referring to the drawings in particular, a multi-page lesson book is shown generally at 10 having a plurality of pages 12. Each page has a front panel 16 with a typical illustration 14 printed thereon and a rear panel 20 imprinted with enumerated questions 22 directed to each lesson in the book. The front sheet 16 contains cut out window portions 18 spaced about the illustration and located adjacent specific identifiable items thereof. Front and rear sheets 16, 20 of each page 12 are joined along their top and bottom edges and also along the inside edge which contains a plurality of spaced apertures 34. A spiral coil spring binder 32 is employed in well known fashion to secure the book pages together. The front and rear sheets 16 and 20 are unsecured along their outer vertical edge which allows an answer sheet to be inserted therebetween.

Each page in the book is provided with an insert sheet 24 which is suitably dimensioned to permit slidable engagement between the page sheets 16 and 20. Suitably positioned about the front side of the insert 24 are a plurality of spaced indicia 30 which are in registry with the window portions 18 in the page. On the reverse side of the insert sheet 24 are printed a plurality of enumerated answers 28 corresponding to the enumerated questions 22 printed upon the back sheet 20 of the preceding page. The insert 24 is provided with a tab portion 26 which suitably identifies, either by a written description or a national flag, the language of the lesson indicia and answers. The tab 26 also allows for the easy insertion and removal of the insert sheet 24 from the page pocket.

In operation, the student would observe the book as shown in FIG. 1 and would mentally name the items in the illustration corresponding to the aperture 18 locations. After formulating the proper indicia in his mind, he would select the corresponding lesson insert sheet and place it within the page pocket. In this position the correct indicia would be visible through their associated window portions and would allow the student to verify his preconceived answers. Thereafter the student would formulate sentence answers to the questions appearing on the back side of the preceding page which apply to the illustration shown. Finally, the student would remove the insert sheet from the page pocket and place it over the illustrated sheet 16 so that the tab portion 26 lies against the spiral binding portion 32 (FIG. 5). In this position each enumerated question 22 will be aligned with the corresponding enumerated answer portion 28 on the back side of the insert sheet 24.

The invention, which is particularly adaptable for instructing English speaking students in foreign languages, may also employ a sheet 24a having imprinted thereon corresponding Spanish indicia 30a and phonetic spellings 30b thereof. This insert sheet is the Spanish equivalent to the insert sheet 24 shown in FIGS. 2a and 2b and carries a tab portion 26a labeled with the appropriate language. This tab portion may also be identified by the national flag of the spoken language. In this form of the invention, the vertical dimension of the insert sheet 24a is smaller than the page pocket dimension by an amount approximately equal to the height of the phonetic portion 30b, thereby allowing upward shifting of the insert within the pocket to expose either portion 30a or 30b through the windows 18.

Thus, it may be seen that the invention has provided an educational device which employs a novel combination of a question portion directed to unnamed items and also carries sentence answers to the questions. It may be readily understood, by those skilled in the education field, that the book is readily adaptable to the teaching of a multiplicity of languages by the mere substitution of different language insert sheets in any desired tongue.

Those skilled in this field will also appreciate that the invention may also be embodied so as to place the pocket opening on the top or the bottom of the page and correspondingly reposition the tab 26 on the insert 24.

While a specific embodiment of the invention has been shown and described in detail to illustrate the application of the invention principles, it will be understood that the invention may be embodied otherwise without departing from such principles.

What is claimed is:

1. An educational book with a plurality of substantially rectangular pages bound together along a common edge, the pages each comprising:
   (a) a first sheet,
   (b) a second sheet, said first and second sheets being secured together about three edges thereof forming a pocket therebetween,
   (c) an illustration of the outer face of said first sheet,
   (d) a plurality of window portions in said first sheet adjacent selected portions of said illustration,
   (e) a plurality of questions on the outer face of the preceding one of said pages, the questions being related to said selected portions of the illustrations on the outer face of said first sheet of the page subsequent to the preceding page,
   (f) a removable insert between said first and second sheets of said subsequent page, the insert having front and rear sides,
   (g) a first set of indicia on said front side of said removable insert, adapted to appear in said window portions when the insert is placed into said pocket, and
   (h) a plurality of answers on the rear side of said insert corresponding to and in alignment with said questions on the outer face of the second sheet of the preceding page.

2. An educational book according to claim 1, wherein said insert is smaller in the vertical direction than said pocket and slidable therein in a vertical direction, said front side of said insert having a second set of indicia thereon, the upper and lower positions of the insert in said pocket causing alternately said first set or said second set of indicia to appear in said window portions.

References Cited in the file of this patent

UNITED STATES PATENTS

| | | |
|---|---|---|
| 1,405,193 | Favreau | Jan. 31, 1922 |
| 1,539,397 | Matravers | May 26, 1925 |
| 1,781,047 | Bondeson | Nov. 11, 1930 |
| 2,503,130 | Poritz | Apr. 4, 1950 |
| 2,628,435 | Minninger | Feb. 17, 1953 |
| 2,924,024 | Studebaker et al. | Feb. 9, 1960 |

FOREIGN PATENTS

| | | |
|---|---|---|
| 21,248 | Great Britain | of 1914 |